US009450862B2

(12) United States Patent
Chen et al.

(10) Patent No.: US 9,450,862 B2
(45) Date of Patent: Sep. 20, 2016

(54) VIRTUAL PRIVATE NETWORK MIGRATION AND MANAGEMENT IN CENTRALLY CONTROLLED NETWORKS

(71) Applicant: Futurewei Technologies, Inc., Plano, TX (US)

(72) Inventors: Huaimo Chen, Bolton, MA (US); Renwei Li, Fremont, CA (US); Xuesong Dong, Pleasanton, CA (US)

(73) Assignee: Futurewei Technologies, Inc., Plano, TX (US)

( * ) Notice: Subject to any disclaimer, the term of this patent is extended or adjusted under 35 U.S.C. 154(b) by 243 days.

(21) Appl. No.: 14/204,827

(22) Filed: Mar. 11, 2014

(65) Prior Publication Data
US 2015/0263867 A1 Sep. 17, 2015

(51) Int. Cl.
| H04L 12/717 | (2013.01) |
| H04L 12/46 | (2006.01) |
| H04L 12/64 | (2006.01) |
| H04L 12/715 | (2013.01) |
| H04L 12/751 | (2013.01) |

(52) U.S. Cl.
CPC .......... *H04L 45/42* (2013.01); *H04L 12/4641* (2013.01); *H04L 12/6418* (2013.01); *H04L 45/04* (2013.01); *H04L 45/02* (2013.01)

(58) Field of Classification Search
None
See application file for complete search history.

(56) References Cited

U.S. PATENT DOCUMENTS

| 6,832,313 | B1 | 12/2004 | Parker |
| 8,549,617 | B2 | 10/2013 | Wei et al. |
| 2006/0168279 | A1* | 7/2006 | Lee ..................... H04L 12/4641 709/230 |
| 2008/0002697 | A1 | 1/2008 | Anantharamaiah et al. |
| 2008/0232379 | A1* | 9/2008 | Mohamed ........... H04L 12/4679 370/395.53 |
| 2009/0016253 | A1 | 1/2009 | Lewis et al. |
| 2010/0046532 | A1* | 2/2010 | Okita ................. H04L 43/0817 370/401 |
| 2011/0265174 | A1 | 10/2011 | Thornton et al. |
| 2013/0322437 | A1* | 12/2013 | Raszuk .................. H04L 45/04 370/389 |

FOREIGN PATENT DOCUMENTS

| CN | 1812363 A | 8/2006 |
| CN | 101471879 A | 7/2009 |
| CN | 102449964 A | 5/2012 |
| EP | 2720415 A1 | 4/2014 |

OTHER PUBLICATIONS

Partial English Translation and Abstract of Chinese Patent Application No. CN101471879, Jun. 29, 2015, 6 pages.

(Continued)

*Primary Examiner* — Edan Orgad
*Assistant Examiner* — Saumit Shah
(74) *Attorney, Agent, or Firm* — Conley Rose, P.C.; Grant Rodolph; Adam J. Stegge (57) ABSTRACT

In a first edge node coupled to a first site, a method of migrating control of at least one virtual private network (VPN) to a central controller, the method comprising taking over a native border gateway protocol (BGP) peer session with a second edge node coupled to a second site, using a first software agent: taking over and maintaining a BGP peer session with a second edge node connected to a second site, receiving a VPN label from the central controller and sending the VPN label to the second edge node via the BGP peer session, and receiving first VPN routes from the second site via the BGP peer session and sending the first VPN routes to the central controller.

19 Claims, 6 Drawing Sheets

(56) References Cited

OTHER PUBLICATIONS

Foreign Communication From a Counterpart Application, PCT Application No. PCT/CN2015/073791, International Search Report dated Jun. 12, 2015, 7 pages.

Foreign Communication From a Counterpart Application, PCT Application No. PCT/CN2015/073791, Written Opinion dated Jun. 12, 2015, 4 pages.

Rosen, E., et al., "BGP/MPLS IP Virtual Private Networks (VPNs)," Network Working Group, The Internet Society, Feb. 2006, RFC 4364, 47 pgs.

* cited by examiner

VIRTUAL PRIVATE NETWORK MIGRATION AND MANAGEMENT IN CENTRALLY CONTROLLED NETWORKS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A virtual private network (VPN) may refer to the extension of a private network across a service provider's network. A VPN may allow a computer (or other network node) to communicate with a private network across shared networks as if the computer was directly connected to the private network, while benefiting from the functionality, security and/or management policies of the private network.

A typical VPN utilizes distributed control of the network. However, with increasing interest in software-defined networking (SDN), centralized control of networks is becoming more of interest because centralized control of networks is a feature of SDN. However, it is not currently known how to migrate a distributed or decentralized VPN to a centrally controlled VPN or how to manage a centrally controlled VPN. Thus, there is a need for migration of control of a VPN from distributed control to centralized control, especially without interrupting service.

SUMMARY

Disclosed herein are example embodiments for migrating a decentralized VPN to a VPN controlled by a central controller. The migration may be performed without service interruption. Prior to migration, a native border gateway protocol (BGP) stack exists on each edge node and may be used to distribute VPN routes and labels in the decentralized network. In example embodiments, a central controller may manage an installation of two software agents on each edge node in a backbone network across which at least one VPN has been established. A first software agent on a first edge node may take over a native BGP peer session with a second edge node. After taking over of the BGP peer session, there may be no need for any BGP software. The first edge node may be coupled to a first site, and the second edge node may be coupled to a second site. The second software agent may form an adjacency with the first site and communicates label and route information between the first site, the central controller, and the second edge node. After software agents on each edge node have been installed and information from each site distributed to the central controller, there may be no need for a BGP session any longer as the duties of the BGP session are accomplished by the central controller. Thus, the agents that are responsible for the BGP sessions are removed from the edge nodes and software agents that provide for communication with the central controller remain on the edge nodes to manage the at least one VPN that has been migrated.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more example embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
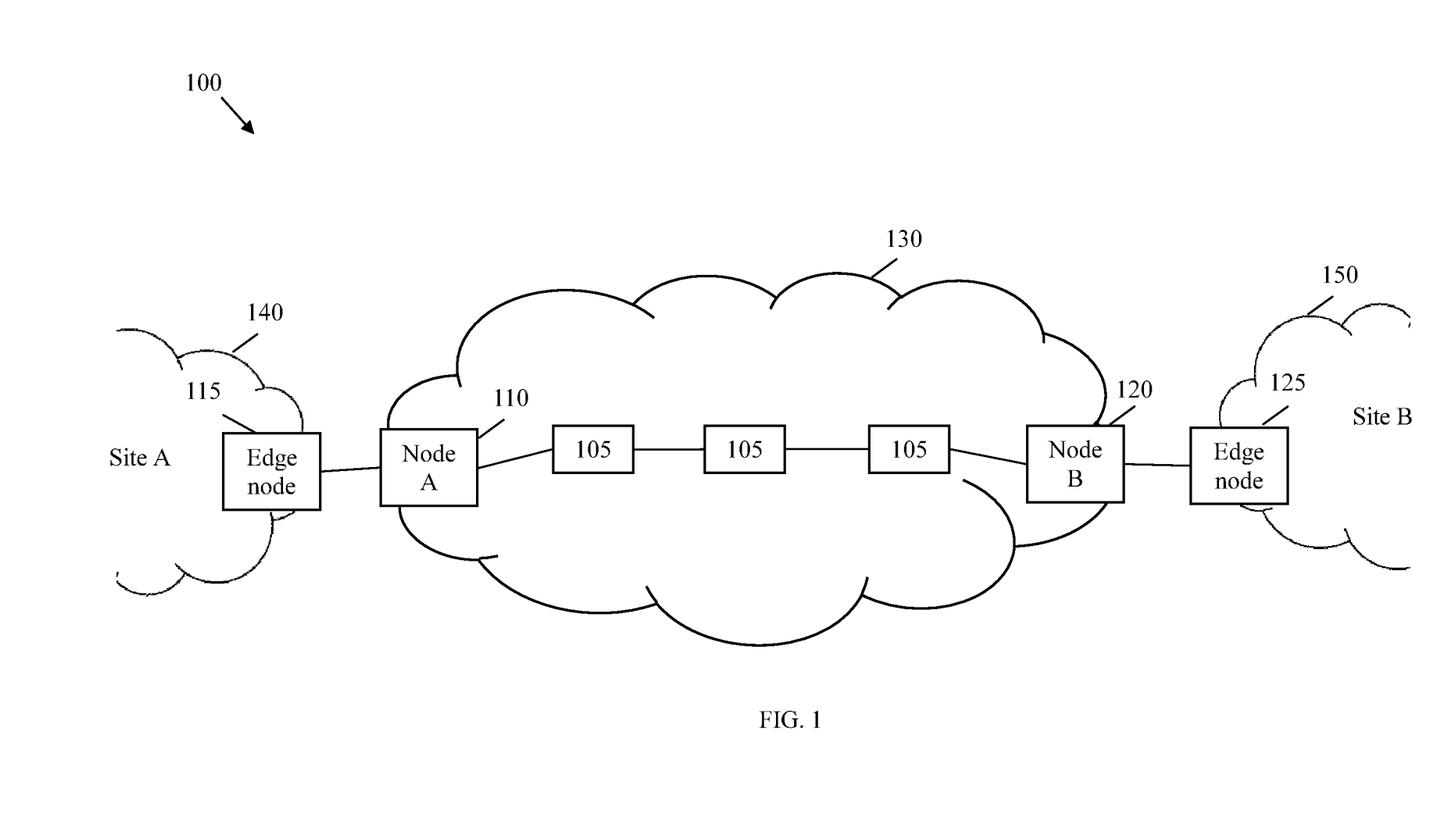
FIG. 1 is an example embodiment of a network.

FIG. 1 is an example embodiment of a network 100 in which at least one VPN may be established. The network 100 comprises a local network 140, sometimes referred to as Site A, a local network 150, sometimes referred to as Site B, and a backbone network 130. The backbone network 130 may be any sort of backbone network, such as a mobile backhaul network. The backbone network 130 comprises edge nodes, denoted as node A 110 and node B 120, and internal nodes 105. The nodes in backbone network 130 may be referred to herein as backbone nodes. Three internal nodes 105 are shown for illustrative purposes, but there may be any number of internal nodes. As used herein, "node" may be synonymous with "router" or "switch". The local networks 140 and 150 each may comprise one or more nodes or end devices (not shown) in addition to the edge nodes 115 and 125. If the backbone network 130 is a mobile backhaul network, node A 110 may be a cell site gateway, internal nodes 105 may be aggregation site gateways, and node B 120 may be a radio network controller (RNC) side gateway.

A VPN may be established between local networks 140 and 150 via backbone network 130. The VPN may be a layer 3 (L3) VPN established using multiprocotol label switching (MPLS) and border gateway protocol (BGP) as understood by a person of ordinary skill in the art. For example, each route within a VPN may be assigned an MPLS label, and when BGP distributes a VPN route, BGP also distributes an MPLS label for that route. The VPN may connect local area networks 140 and 150 via the path illustrated connecting nodes A 110 and B 120 via internal nodes 105. In such a VPN node A 110 and node B 120 may be referred to as VPN provider edge nodes. Control of the VPN is performed in a distributed manner.

Disclosed herein are systems, methods, apparatuses, and computer program products for migrating and managing control of one or more VPNs from distributed control to centralized control without interrupting service. After migration, all VPNs in a service area may be controlled by a central controller. Native protocols, such as BGP, on backbone nodes may be replaced by communication software installed on backbone nodes by a central controller to provide for migration of one or more VPNs. After migration is complete, part of the communication software may be removed and VPNs that backbone nodes are a part of may be managed by the central controller.

Software-defined networking (SDN) is a relatively new technology, which, among other things, introduces the notion of a central controller. Conventional packet networks utilize distributed control, but in SDN part of the control of a network may be placed under the control of a central controller. The portion of a network controlled by a central controller may be referred to as an SDN domain, and the portion of a network not under the control of a central controller may be referred to as a non-SDN domain.

Figure 2:
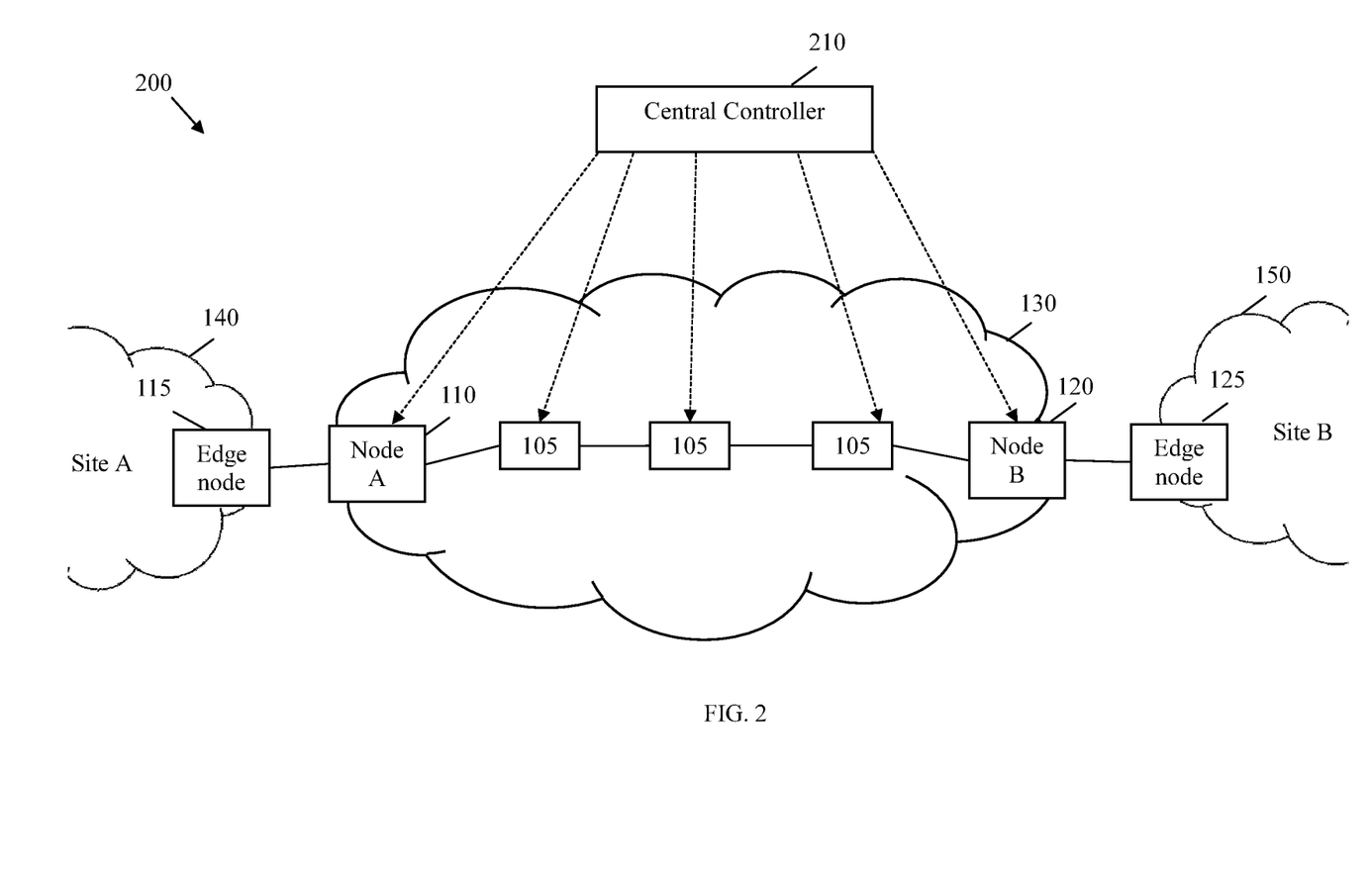
FIG. 2 is an example embodiment of a network.

FIG. 2 is an example embodiment of a network 200 that may be the same as network 100, except for the introduction of a central controller 210. In the interest of conciseness, the description of elements of network 200 that are the same as the elements of network 100 are not described. In addition to the elements described earlier, the network 200 comprises a central controller 210 as shown in FIG. 2. The central controller 210 may be capable of communicating with each of nodes A 110, node B 120, and internal nodes 105 and performing a migration of a VPN running over backbone network 130 and connecting local networks 140 and 150. There are a variety of ways known to a person of ordinary skill in the art in which the central controller 210 may communicate with node A 110, node B 120, and internal nodes 105, and one of those ways is through the use of the OpenFlow protocol.

Figure 3:
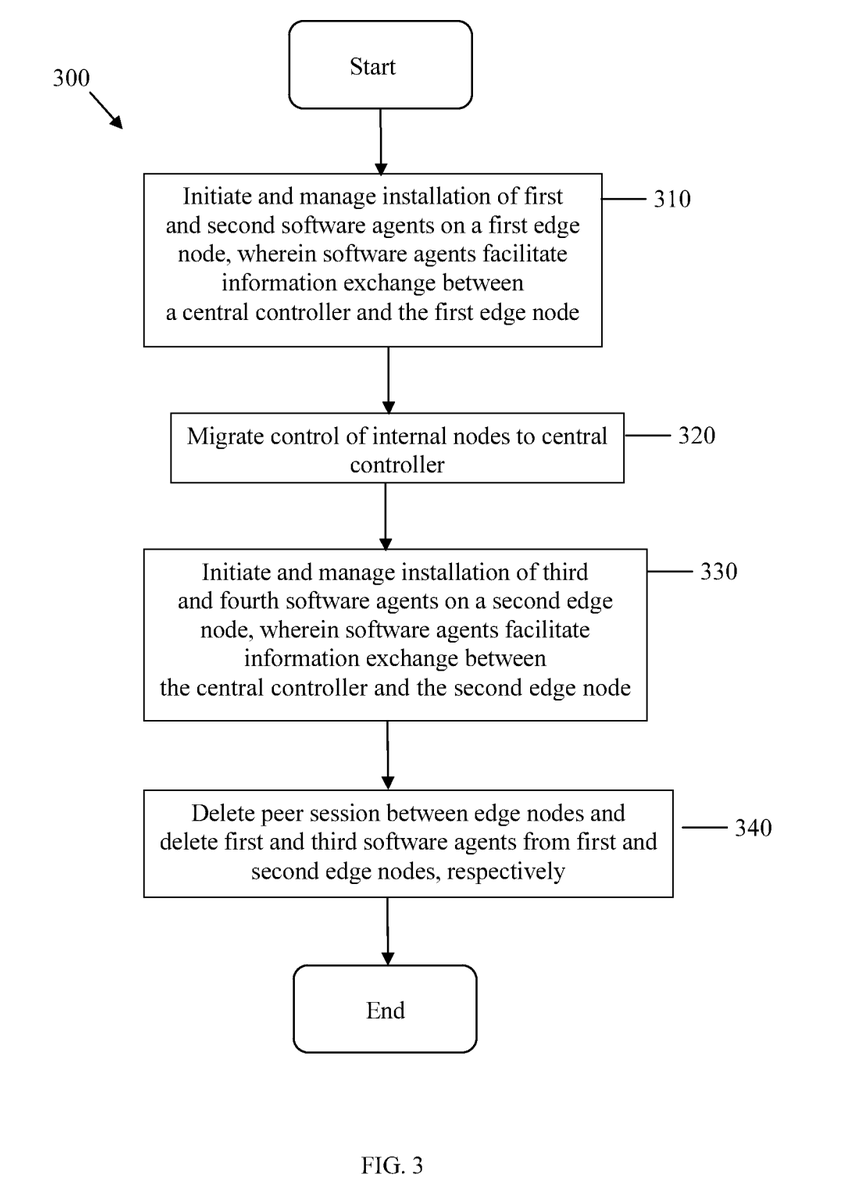
FIG. 3 is a flowchart of an example embodiment of a method.

FIG. 3 is a flowchart of an example embodiment of a method 300 for migrating a VPN. The blocks of FIG. 3 are discussed with reference to FIG. 2 as an example network architecture for migrating a VPN in which the steps of the method 300 may be performed. Step 310 is performed using coordinated effort of a central controller and a first edge node, such as central controller 210 and node A 110, respectively. In step 310 a central controller initiates and manages installation of a first software agent and a second software agent on a first edge node. The installation of the first and second software agents may be performed as an in-service software upgrade (ISSU). The central controller may send the first software agent and the second software agent to the first edge node for installation on the first edge node. The first edge node may be responsible for helping to provide a VPN across a backbone network, such as network 130. The first software agent may be referred to as a backward compatible agent for a VPN (BCAV), and the second software agent may be referred to as a backward compatible agent for a site (BCAS). A software agent may also be referred to as a client.

The first software agent performs or causes the first edge node, such as node A 110, to take over a BGP peer session with a remote VPN edge node, such as node B 120. The remote VPN edge node may also be referred to as a second edge node. The BGP peer session may be used to exchange information between the first edge node and the remote VPN edge node. The first software agent may be a replacement of or substitute for native BGP software residing on the first edge node, and the BGP peer session may take the place of a BGP peer session (which may be referred to as a native BGP peer session) running using the native BGP software. In one embodiment, the first software agent performs or causes the first edge node to (1) obtain a VPN label for a VPN from the central controller and send this label to the remote VPN edge node (e.g., via the BGP peer session); (2) receive a VPN label from the remote VPN edge node (e.g., via the BGP peer session) and send the label to the central controller; and (3) receive remote VPN routes from the remote VPN edge node (e.g., via the BGP peer session) and send them to the central controller. The remote VPN routes may be VPN routes for a site to which the remote VPN edge node is connected. In another embodiment, the first software agent performs or causes the first edge node to (1) obtain a VPN label for a VPN route from the central controller and send this label with the VPN route to the remote VPN edge node; and (2) receive a VPN label with a VPN route from the remote VPN edge node and send the label with the VPN route to the central controller.

The second software agent performs or causes the first edge node to perform the following tasks: (1) take over a protocol adjacency with a site to which the first edge node is connected, such as site A 140; (2) obtain VPN routes from the site through the protocol adjacency and send the routes to the central controller; (3) receive VPN routes from the remote VPN edge node via the central controller and send them to the site.

In step 310, the central controller may control the first software agent (in the first edge node) for taking over a native BGP peer session with the second edge node (i.e., migrating the native BGP peer session to a BGP peer session controlled by the first software agent smoothly) and control the second software agent for taking over a native protocol adjacency with the site (i.e., migrating the native adjacency to an adjacency controlled by the second software agent smoothly). The central controller may install the first software agent and the second software agent on the first edge node via an ISSU. In an embodiment, the central controller may allocate a VPN label for a VPN and send it to the first software agent, as well as send local VPN routes to the first software agent. The central controller may also: (1) receive the VPN label for the second edge node from the first software agent; (2) add a forwarding entry to the VPN routing and forwarding (VRF) table in the first edge node when receiving a new remote VPN route; and (3) delete a forwarding entry from the VRF in the first edge node when receiving a remote VPN route withdrawal. In another embodiment, the central controller may allocate a VPN label for a VPN route and send the VPN route with the VPN label to the first software agent. The central controller may also: (1) receive a VPN route with a VPN label for the second edge node from the first software agent; (2) add a forwarding entry to the VRF table in the first edge node if the VPN route is a new route; and (3) delete a forwarding entry from the VRF in the first edge node when receiving a remote VPN route withdrawal. One implication to note is that remote VPN routes from the second edge router are communicated via the first software agent in the first edge router to the central controller. Then the central controller sends the remote VPN routes to the second software agent, and the second software agent sends them to the first site. A new remote VPN route may be added subsequent to completion of step 340. A VRF table may be stored in the first edge node and used by the first edge node for routing and/or forwarding VPN packets received by the first edge node.

In step 320, an ISSU may be performed on nodes internal to the backbone network, e.g., nodes 105 as shown in FIG. 1, to turn over control of the VPN on the internal nodes to the central controller. During the migration of an internal node, an MPLS LSP tunnel between the first edge node and the second edge node is maintained and is not affected. In the meantime, the first and second software agents on the first edge node continue to operate, e.g., the BGP session between the first and second edge nodes is maintained during upgrade of the internal nodes.

Step 330 is performed using coordinated effort of the central controller and the second edge node, e.g., node B 120. In step 330 the central controller initiates and manages installation of a third software agent and a fourth software agent on the second edge node. The installation of the third and fourth software agents may be performed as an in-service software upgrade (ISSU). The second edge node may be responsible for helping to provide a VPN across the backbone network, such as network 130. The third software agent may be a BCAV, and the fourth software agent may be a BCAS. The third software agent may perform the same functions on the second edge node as the first software agent performs on the first edge node. Also, the fourth software agent may perform the same functions on the second edge node as the second software agent performs on the first edge node.

The third software agent performs or causes the second edge node to take over a BGP peer session with a remote VPN edge node (i.e., the first edge node), such as node A 110. Note that in step 310 the first edge node takes over a BGP peer session with the second edge node. The peer session in step 310 was a peer session with the second edge node using the native BGP capability of the second edge node. The third software agent maintains the BGP peer session with the first edge node while allowing for the removal of the native BGP capability from the second edge node. After step 340 is complete, the third software agent is removed or deleted from the second edge node after the central controller can (1) receive a VPN route from the second software agent on the first edge node and send the VPN route to the fourth software agent on the second edge node, and (2) receive a VPN route from the fourth software agent on the second edge node and send the VPN route to the second software agent on the first edge node because it is no longer needed. In one embodiment, the third software agent also performs or causes the second edge node to: (1) obtain a VPN label for a VPN from the central controller and send this label to the remote VPN edge node; (2) receive a VPN label from the remote VPN edge node and send the label to the central controller; and (3) receive remote VPN routes from the remote VPN edge node and send them to the central controller. In another embodiment, the third software agent performs or causes the second edge node to (1) obtain a VPN label for a VPN route from the central controller and send the VPN route with the label to the remote VPN edge node; and (2) receive a VPN route with a VPN label from the remote VPN edge node and send the VPN route with the VPN label to the central controller.

The fourth software agent performs or causes the second edge node to perform the following tasks: (1) take over a protocol adjacency with a second site to which the second edge node is connected, such as site B 150; (2) obtain VPN routes from the second site through the protocol adjacency and send the routes to the central controller; (3) receive routes from the first edge node via the central controller and send them to the second site.

In step 330, the central controller may control the third software agent (in the second edge node) for taking over a BGP peer session with the first edge node and control the fourth software agent for taking over a protocol adjacency with the second site. The central controller may install the third software agent and the fourth software agent on the second edge node via an ISSU. In an embodiment, the central controller may: (1) allocate a VPN label for a VPN and send it to the third software agent; (2) send local VPN routes to the third software agent; (3) receive the VPN label for the first edge node from the third software agent; (4) add a forwarding entry to the VRF table in the second edge node when receiving a new remote VPN route; and (5) delete a forwarding entry from the VRF in the second VPN edge node when receiving a remote VPN route withdrawal. In another embodiment, the central controller may: (1) allocate a VPN label for a VPN route and send the VPN route with the VPN label to the third software agent; (2) receive a VPN route with a VPN label for the first edge node from the third software agent; (3) add a forwarding entry to the VRF table in the second edge node if the VPN route is a new route; and (4) delete a forwarding entry from the VRF in the second edge node when receiving a remote VPN route withdrawal. One implication to note is that remote VPN routes from the first edge router are communicated via the third software agent in the second edge router to the central controller. Then the central controller sends the remote VPN routes to the fourth software agent, and the fourth software agent sends them to the second site.

The first and third software agents may be referred to as different instantiations of the same software agent (i.e., a BCAV). Likewise the second and fourth software agents may be referred to as different instantiations of the same software agent (i.e., a BCAS). One purpose of the BCAV is to remove protocols, such as BGP, from a network node by node and transfer information about sites to a central controller. In step 330, after installing the third software agent on the second edge node, the third software agent on the second edge node sends the information about Site A to the central controller in addition to maintaining the session between the first edge node and the second edge node. Moreover, native BGP capability on the second edge node is no longer needed and can be removed since the BGP peer session originally maintained by native BGP on the second edge node is maintained by the third software agent on the second edge node.

After performing the steps 310-330 as described above, step 340 is performed in which the peer session between the first and second edge nodes (e.g., node A 110 and node B 120) may be deleted because it is no longer needed. Also, the first software agent and the third software agent may deleted from the first and the second edge nodes, respectively, because they are no longer needed.

After steps 310-340 are complete migration of a VPN between the first and second edge nodes may be complete. The second software agent may remain on the first edge node, and the fourth software agent may remain on the second edge node. The second software agent runs on the first edge node and performs the following tasks after migration: (1) maintain a protocol adjacency with the site connected to the first edge node; (2) obtain updated routes from the site through the protocol adjacency and send them to the central controller; and (3) receive routes from the central controller (obtained from the second edge node) and send them to the site. The portion of a network controlled by a central controller may be referred to as an SDN domain. Thus, after migration, the backbone network, such as backbone network 130, may be referred to as an SDN domain, whereas during migration, the nodes that have been placed under control by a central controller may be an SDN domain, and nodes not under control by the central controller may be referred to as a non-SDN domain. As migration to a central controller progresses, the SDN domain grows and the non-SDN domain shrinks.

After migration, the central controller performs the following tasks for an existing VPN: (1) control the second software agent for maintaining protocol adjacency with the site; (2) receive routes from the second software agent and send routes to the fourth software agent on the second edge node; (3) add a forwarding entry to the VRF on the second edge node when receiving a new route; and (4) delete a forwarding entry from the VRF when receiving a route withdraw. In an embodiment, in addition to the above tasks, for a newly configured VPN, the central controller performs the following tasks: (1) allocate a VPN label for a VPN node for the VPN and store it for the other VPN nodes in the same VPN; and (2) use this VPN label when updating VRFs in the VPN edge nodes for VPN routes. For example for the network 200, for a newly configured VPN, the central controller may: (1) allocate a VPN label for the first VPN edge node and store it for the second VPN edge node in the same VPN; and (2) use this VPN label when updating VRFs in the first and second VPN edge nodes for VPN routes. In another embodiment, for a newly configured VPN, the central controller performs the following tasks: (1) allocate a VPN label for a VPN node for each VPN route in the VPN and store it for the other VPN nodes in the same VPN; and (2) use this VPN label when updating VRFs in the VPN edge nodes for the VPN route.

Figure 4:
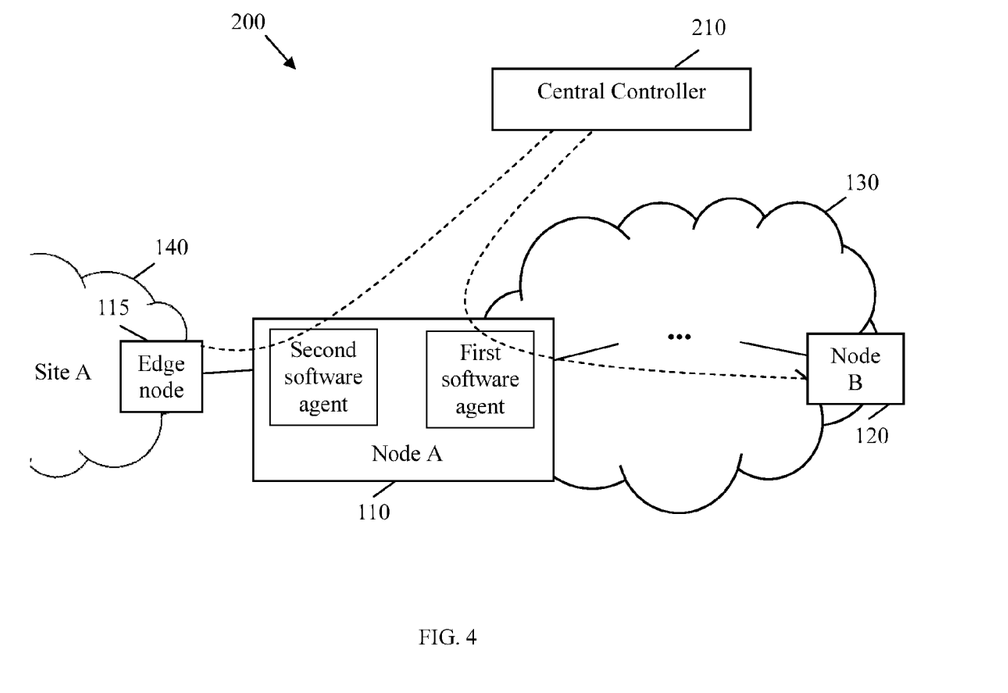
FIG. 4 is an example embodiment of a network.

FIG. 4 is an example embodiment of the network 200 after step 310 has been performed. As discussed above, in step 310, first and second software agents may be installed on a first edge node. The first and second software agents may be provided to node A 110 by the central controller 210. Referring to the network 200 in FIG. 4 to illustrate step 310, the communication paths between node B 120 and the central controller 210 and between the edge node 115 and the central controller 210 are illustrated by dashed lines. Thus, information may be communicated between the edge node 115 and the central controller 210 as facilitated by the second software agent, and information may be communicated between node B 120 and the central controller as facilitated by the first software agent. In step 340, the first software agent is removed because it is no longer needed to provide for communication between node A 110 and node B 120, as the central controller 210 disseminates information between these nodes.

Figure 5:
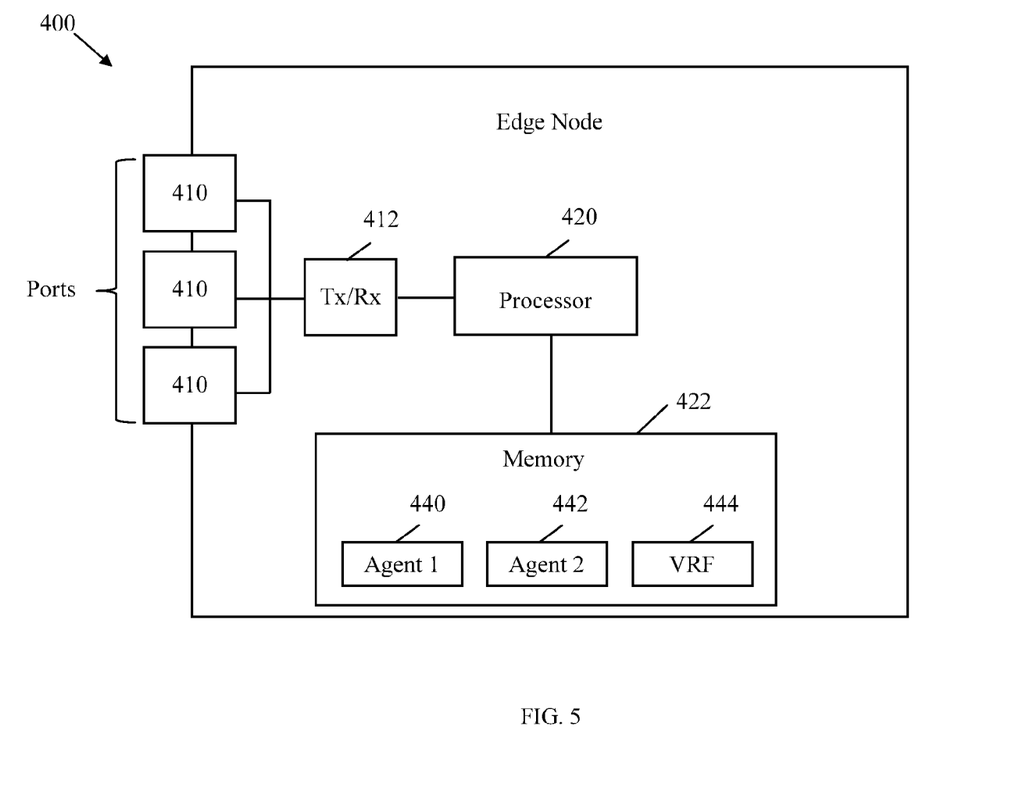
FIG. 5 is an example embodiment of an edge node.

FIG. 5 is an example embodiment of an edge node 400. The edge node 400 comprises ports 410, a transmitter/receiver (Tx/Rx) or transceiver 412, a processor 420, and a memory 422 configured as shown in FIG. 5. The edge node 400 may be an edge node in a backbone network that can support one or more VPNs. The edge node 400 may, for example, be configured as node A 110 or node B 120 described previously. The edge node 400 may comprise one or more ports 410 coupled to transceiver 412. Although only one transceiver 412 is shown for illustrative purposes, there may be more than one transceiver, such as one transceiver per port. The edge node 400 may comprise a processor 420 coupled to the transceiver 412 and configured to process the packets or otherwise determine to which network components to send the packets. The processor 420 may be implemented using hardware or a combination of hardware and software. Although illustrated as a single processor, the processor 420 is not so limited and may comprise multiple processors. The processor 420 may be implemented as one or more central processor unit (CPU) chips, cores (e.g., a multi-core processor), field-programmable gate arrays (FPGAs), application specific integrated circuits (ASICs), and/or digital signal processors (DSPs).

The edge router 400 may further comprise a memory 422. The memory 422 may be used to store instructions for carrying out the methods described herein, e.g., for instructions for software agents and forwarding and routing tables. The memory 422 may store instructions for a first software agent 440, instructions for a second software agent 442, and a VRF 444. The first software agent 440 may be the same as the BCAV discussed previously, and the second software agent 442 may be the same as BCAS. The installation of software agents 440 and 442 may be controlled by a central controller, such as the central controller 210. Furthermore, the first software agent 440 may be installed for a period of time before being removed as described previously. The memory 422 may comprise secondary storage, random access memory (RAM), and/or read-only memory (ROM) and/or any other type of storage. The secondary storage may comprise one or more disk drives or tape drives and is used for non-volatile storage of data and as an over-flow data storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage.

The processor 420 and the transceiver 412 may also be configured to implement or support at least part of any of the schemes and methods described above, such as the steps of the method for migrating a VPN 300 performed in an edge node. Finally, although the ports 410 are illustrated as bidirectional ports coupled to a transceiver, one of ordinary skill in the art will understand that alternatively the edge node 400 may comprise unidirectional ports coupled to a transmitter or receiver, depending on whether the port is an ingress or egress port, respectively.

Figure 6:
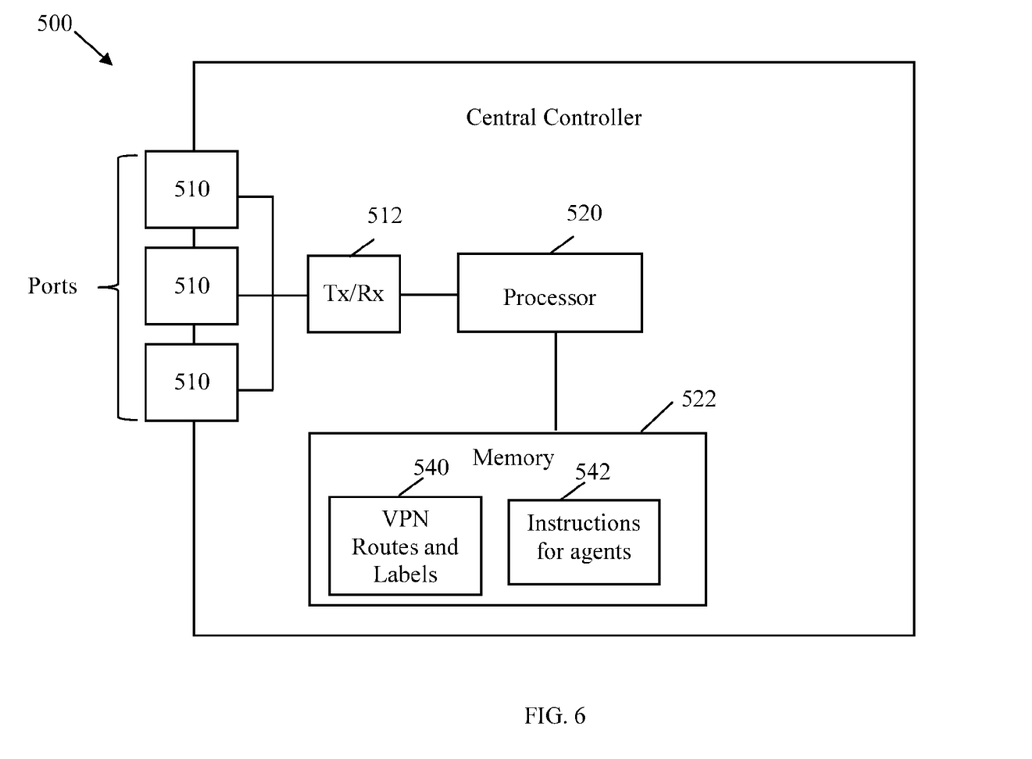
FIG. 6 is an example embodiment of a central controller.

FIG. 6 is an example embodiment of a central controller 500. The central controller 500 comprises ports 510, a transmitter/receiver (Tx/Rx) or transceiver 512, a processor 520, and a memory 522 configured as shown in FIG. 6. The central controller 500 may be capable of communicating with nodes in a backbone network. For example, the central controller 500 may be the same as central controller 210 described previously. The ports 510, transceiver 512, processor 520 and memory 522 may share many of the same characteristics as the ports 410, transceiver 412, processor 420 and memory 422, respectively, described previously. In the interest of conciseness, only the characteristics of these elements that are different than those described previously are described here.

The memory 522 may be used to store instructions for carrying out the methods described herein, e.g., instructions for software agents that are communicated to edge nodes, such as the first software agent 440 and second software agent 442 described previously, represented by 542 in FIG. 6. The memory 522 may also store information on VPN routes and corresponding labels, represented by 540 in FIG. 6. The processor 520 and the transceiver 512 may also be configured to implement or support at least part of any of the schemes and methods described above, such as the steps of the method for migrating a VPN 300 performed in a central controller. The central controller 500 may be one of a plurality or a cluster of central controllers that together perform the functions of a central controller 210 in the architecture of FIG. 2.

It is understood that by programming and/or loading executable instructions onto the edge node 400, at least one of the processor 420 and/or the memory 422 are changed, transforming the edge node 400 in part into a particular machine or apparatus (e.g., the edge nodes 110 or 120) having the functionality taught by the present disclosure. The executable instructions may be stored on the memory 422 and loaded into the processor 420 for execution. Similarly, it is understood that by programming and/or loading executable instructions onto the central controller 500, at least one of the processor 520 and/or the memory 522 are changed, transforming the central controller 500 in part into a particular machine or apparatus (e.g., the central controller 210) having the functionality taught by the present disclosure. The executable instructions may be stored on the memory 522 and loaded into the processor 520 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several example embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various example embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. In a first edge node coupled to a first site, a method of migrating control of at least one virtual private network (VPN) to a central controller, the method comprising:
   taking over a native border gateway protocol (BGP) peer session with a second edge node coupled to a second site; and
   using a first software agent to perform the steps of:
      taking over and maintaining a BGP peer session with the second edge node;
      receiving a first VPN route with a first VPN label from the central controller and sending the first VPN route with the first VPN label to the second edge node via the BGP peer session; and
      receiving a second VPN route with a second VPN label from the second edge node coupled to the second site via the BGP peer session and sending the second VPN route with the second VPN label to the central controller.

2. The method of claim 1, further comprising using a second software agent to perform the steps of:
   receiving the first VPN route from the first site and sending the first VPN route to the central controller;
   receiving the second VPN route from the central controller; and
   sending the second VPN route to the first site.

3. The method of claim 2, further comprising using the central controller to perform the steps of:
   receiving the first VPN route from the second software agent:
   allocating the first VPN label;
   sending the first VPN route with the first VPN label to the first software agent; and
   receiving the second VPN route with the second VPN label from the first software agent and sending the second VPN route to the second software agent.

4. The method of claim 2, further comprising installing the first software agent and the second software agent, wherein the first software agent and the second software agent are received from the central controller.

5. The ethod of claim 3, wherein after the second software agent on the first edge node is stable, the method further comprises:
   ending the BGP peer session with the second edge node; and
   deleting the first software agent.

6. The method of claim 5, further comprising using the second software agent to perform the steps of:
   receiving an update to the first VPN route from the first site and sending the updated first VPN route to the central controller;
   receiving an update to the second VPN route from the central controller; and
   sending the updated second VPN route to the first site.

7. The method of claim 6, further comprising using the central controller to perform the steps of:
   receiving the update to the first VPN route from the second software agent, allocating the first VPN label, updating a VPN routing and forwarding (VRF) on the first edge node and the second edge node based on the update and the VPN label, and sending the update to the first VPN route to the second software agent on the second edge node; and
   receiving the update to the second VPN route from the second software agent on the second edge node, allocating the second VPN label, updating the VRF on the first edge node and the second edge node based on the update and the VPN label, and sending the update to the second VPN route to the second software agent on the first edge node.

8. In a central controller, a method for migrating and managing a virtual private network (VPN) comprising a first edge node for a first site and a second edge node for a second site, the method comprising:
   sending a first software agent to the first edge node for installation on the first edge node;
   sending a second software agent to the first edge node for installation on the first edge node;
   allocating a first VPN label for a first VPN route from the first site via the second software agent;
   sending the first VPN route with the first VPN label to the first software agent;
   receiving a second VPN route with a second VPN label for a second edge node from the first software agent; and
   sending the second VPN route for the second site from the second edge node to the second software agent.

9. The method of claim 8, further comprising:
   adding a forwarding entry into a VPN routing and forwarding (VRF) table on the first edge node and the second edge node based on the first VPN route and the first VPN label; and
   adding a forwarding entry into a VRF table on the first edge node and the second edge node based on the second VPN route and the second VPN label.

10. The method of claim 8, wherein the first software agent maintains a border gateway protocol (BGP) peer session with the second edge node, and wherein the second software agent maintains a protocol adjacency with the first site.

11. The method of claim 8, further comprising:
    sending a third software agent to the second edge node for installation on the second edge node, wherein the third software agent takes over a border gateway protocol (BGP) peer session from native BGP software; and
    sending a fourth software agent to the second edge node for installation on the second edge node, wherein the fourth software agent takes over a protocol adjacency with the second site.

12. The method of claim 11, wherein after the second software agent on the first edge node and the fourth software agent on the second edge node are stable, the method further comprises:
    requesting that the first edge node remove the first software agent; and
    requesting that the second edge node remove the third software agent.

13. The method of claim 12, wherein after the first software agent and the third software agent are removed, the method further comprises:
    receiving a new VPN route for the first site via the second software agent;
    allocating a VPN label for the new VPN route; and
    adding a forwarding entry to a VPN routing and forwarding (VRF) table in the first edge node and the second edge node corresponding to the new VPN route and the VPN label.

14. The method of claim 12, wherein after the first software agent and the third software agent are removed, the method further comprises:
    receiving a new VPN route for the second site via the fourth software agent;
    allocating a VPN label for the new VPN route; and
    adding a forwarding entry to a VPN routing and forwarding (VRF) table in the first edge node and the second edge node corresponding to the new VPN route and the VPN label.

15. A computer program product comprising computer executable instructions stored on a non-transitory computer readable medium such that when executed by a processor cause a central controller to:
    receive a new remote virtual private network (VPN) route from a first edge node at a first site;
    allocate a VPN label for the new remote VPN route;
    add a forwarding entry to a VPN routing and forwarding (VRF) table in the first edge node and a second edge node, wherein the forwarding entry is based on the new remote VPN route and the VPN label;
    send a first software agent to the first edge node for installation on the first edge node; and
    send a second software agent to the first edge node for installation on the first edge node.

16. The computer program product of claim 15, further comprising instructions that cause the central controller to:
    send a first VPN route with the VPN label to the second software agent; and
    receive a second VPN route from the second edge node for a second site via the second software agent.

17. The computer program product of claim 16, wherein the first software agent takes over a border gateway protocol (BGP) peer session with the second edge node, and wherein the second software agent takes over an adjacency with the first site.

18. The computer program product of claim 17, further comprising instructions that cause the central controller to:
- send a third software agent to the second edge node for installation on the second edge node, wherein the third software agent takes over the BGP peer session from native BGP software; and
- send a fourth software agent to the second edge node for installation on the second edge node, wherein the fourth software agent takes over an adjacency with the second site.

19. The computer program product of claim 18, wherein after the second software agent on the first edge node and the fourth software agent on the second edge node are stable, the instructions further cause the central controller to:
- request that the first edge node remove the first software agent; and
- request that the second edge node remove the third software agent.

* * * * *

UNITED STATES PATENT AND TRADEMARK OFFICE
CERTIFICATE OF CORRECTION

| | | |
|---|---|---|
| PATENT NO. | : 9,450,862 B2 | Page 1 of 1 |
| APPLICATION NO. | : 14/204827 | |
| DATED | : September 20, 2016 | |
| INVENTOR(S) | : Chen et al. | |

It is certified that error appears in the above-identified patent and that said Letters Patent is hereby corrected as shown below:

In the Claims

Column 11; Line 16, Claim 5 should read:

5. The method of claim 3, wherein after the second software agent on the first edge node is stable, the method further comprises:
    ending the BGP peer session with the second edge node; and
    deleting the first software agent.

Signed and Sealed this
Third Day of January, 2017

Michelle K. Lee
*Director of the United States Patent and Trademark Office*